Aug. 29, 1967     T. B. MILLER     3,338,455
SAFETY CAP AND FILLER NECK COMBINATION
Filed May 13, 1965
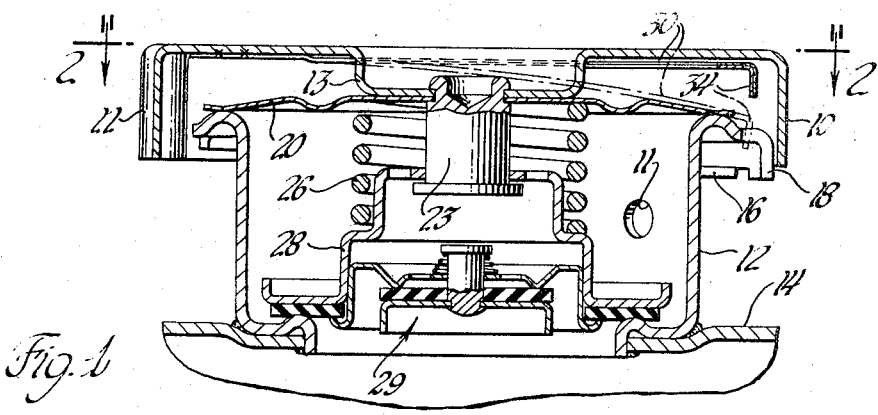
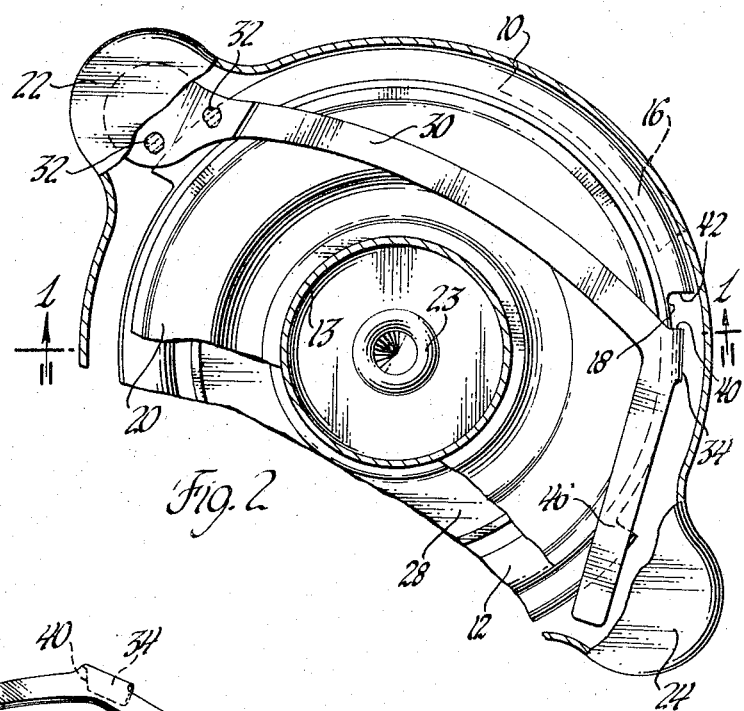
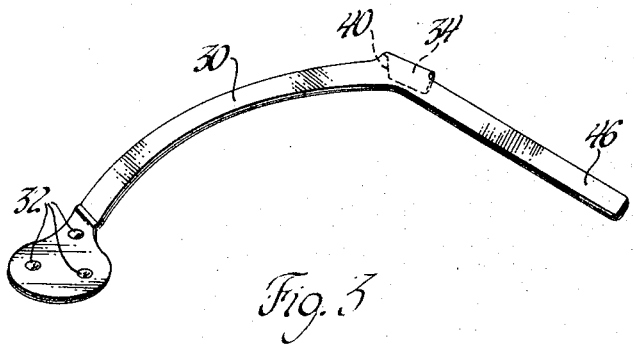
INVENTOR.
Tom B. Miller
BY
George E. Johnson
ATTORNEY

United States Patent Office 3,338,455
Patented Aug. 29, 1967

3,338,455
SAFETY CAP AND FILLER NECK
COMBINATION
Tom B. Miller, Grand Blanc, Mich., assignor to General Motors Corporation, Detroit, Mich., a corporation of Delaware
Filed May 13, 1965, Ser. No. 455,487
4 Claims. (Cl. 220—40)

ABSTRACT OF THE DISCLOSURE

A safety container closure for preventing scalding in the form of a pressure actuated cap and container filler neck combination with a bimetal element locking the cap and neck closed when hot and releasing one from the other when cold.

This invention relates to caps and filler necks for heated vessels or liquid containers such as automobile radiators.

It is well known that automobile radiators operate under substantial engine coolant pressure and if a cap forming a closure for a radiator filler opening were suddenly removed from the opening such as by an inexperienced attendant, an overheated engine could possibly cause hot coolant to spout forth and sometimes this may present a danger to the operator.

An object of this invention is to provide an improved cap and filler neck combination for a pressurized and heated container in which arrangement the cap is positively locked in closed position as a matter of safety until or unless the container being served is at a temperature at which there is no danger in the removal of the cap from the filler neck.

A feature of this invention is a cap and filler neck nonrotatively locked together or fixed in position while heated, the locking being a function of a thermally actuated locking member interposed between them and the cap being conveniently removable at reduced temperature. Another feature of this invention is a cap for a filler neck of a pressurized vessel with a bimetallic element fixed to the cap and positioned to serve as a locking member when subjected to one temperature and as a releasing or unlocking member when subjected to a different temperature.

These and other important features of the invention will now be described in detail in the specification and then pointed out more particularly in the appended claims.

In the drawings:

FIGURE 1 is a sectional view of a cap and radiator filler neck embodying the present invention and as the cap and neck are viewed in the direction of the arrows 1—1 in FIGURE 2, a portion of a radiator also being shown;

FIGURE 2 is a part sectional view looking in the direction of the arrows 2—2 in FIGURE 1, the radiator being omitted; and FIGURE 3 is a perspective view of a bimetal locking member utilized in the cap of FIGURES 1 and 2.

Closures or caps of the general type herein considered and without the thermal locking feature are exemplified by the United States Patent No. 2,266,314 granted Dec. 16, 1941, in the name of J. E. Eshbaugh.

The cap in which the present invention is embodied comprises a cover 10 rotationally cammed into closed position on the top or open flanged end of a filler neck 12 serving a radiator having a top tank wall partially shown at 14. The camming action manually to apply or remove the cap is by a bayonet-type interlock of diametrically opposed fingers 16 on the cover 10 and exposed notches 18 on the neck 12. A sealing disk 20 of resilient construction is held to the cover 10 by a central rivet 23. The parts thus far described plus a spring 26, an inner cup 28, a vent 11, and a vacuum relief valve arrangement 29 are conventional and are as shown in the Patent 2,266,314 above referred to. These details are not further described herein as they are subjected to a wide variation when utilized in practicing the present invention. It is conventional to provide such a cover 10 with opposite protrusions 22 and 24 to facilitate manual rotation of the cap to remove the latter or operatively position it with relation to the neck 12 or radiator tank 14.

An elongated bimetal locking element 30 is an important and basic item of the present invention and it has one end spot-welded as at 32 to the cover 10 and within the protrusion 22. The element extends part way around a central cup portion 13 of the cover 10 and is provided with a depending tab 34 located outside the circular contour of the sealing disk 20 and adapted to register with one of the notches 18 in the neck 12 when the cap is heated and in operative or closing position.

After the cap is placed in closed position on the neck by rotation and consequent cam action, the bimetal element 30 will assume a position as shown in full lines in FIGURE 1 the assumption being that a cool room or "safe" temperature prevails as to the radiator tank 14 and cap and, hence, the element 30. The cap is then free to be manually rotated and opening of the neck entails no danger to the operator.

Assuming, however, that an elevated temperature exists in the tank 14, this will effect a bending of the bimetal element and the latter will be inclined downwardly as shown in dot and dash lines in FIGURE 1. The tab 34 will extend into the appropriate notch 18 and prevent rotation and removal of the cap until or unless the tank 14 and its contents have cooled to a "safe" temperature. If an attempt is made to remove a "hot" cap, a shoulder 40 on the tab 34 will engage a shoulder 42 at one end of the notch 18 and prevent the rotation necessary as a step preliminary to the removal. The free end 46 of the bimetal element 30 is extended in order to supplement the stop action of the tab 34. When cap removal is prevented by the shoulders 40 and 42 engaging, the free end 46 engages the inside surface of the cover 10 so that no undue strain on the element 30 will occur.

I claim:

1. A cap and filler neck forming two units in combination, cam means holding said cap in closing position on one end of said filler neck, a bimetal element interposed between said units, one portion of said bimetal element being fixed to said cap, a shoulder on said bimetal element, a second shoulder on said filler neck, said shoulders being arranged to engage and hold said units in closed position and in opposition to relative rotation at one temperature, and said bimetal element being arranged to assume a position disengaging said shoulders at another temperature.

2. A cap and filler neck forming two units in combination, said neck being in the form of a flanged tube with open ends, cam means on said units holding said cap in closing and sealing position on one open end of said filler neck upon rotation of said cap in one direction and for releasing said cap from and opening said filler neck upon rotation of said cap in the opposite direction, an elongated bimetal element interposed between said units with one end thereof fixed to one of said elements and a tab on said element being arranged to lock the said units together against relative rotation at one temperature and to unlock them at another temperature.

3. A cap and filler neck forming two units in combination, said neck being in the form of a flanged tube with open ends, a sealing disk on said cap and engaging one open end of said filler neck to seal the same, cam means holding said cap in closing position, a bimetal element interposed between said units one end of said bimetal element being fixed to said cap, a shoulder on said neck, a tab on said bimetal element and located outside the contour of said disk and in rotational alignment with said shoulder to lock said units together at one temperature, and the arrangement being such that a decrease in temperature will disengage said tab from alignment with said shoulder and serve to unlock said units.

4. A cap and open ended filler neck forming two units rotationally joined in sealed relation, a temperature responsive element with one end fixed to one of said units and extending partially around the axes of said cap and neck, a first shoulder on said element and spaced from said one end, a second shoulder on the other of said units and in rotational alignment with the said first shoulder to serve as a stop, and said element being such that a lowering in temperature will bring said shoulders out from said rotational alignment.

References Cited
UNITED STATES PATENTS

| | | | |
|---|---|---|---|
| 2,250,045 | 7/1941 | Focke et al. | 220—40 |
| 2,528,372 | 10/1950 | Kellogg | 220—39 |
| 3,102,660 | 9/1963 | Bowden | 220—40 |

THERON E. CONDON, *Primary Examiner.*

G. T. HALL, *Assistant Examiner.*